(No Model.)
C. S. SHEPARD.
MILK CAN.
No. 258,948. Patented June 6, 1882.
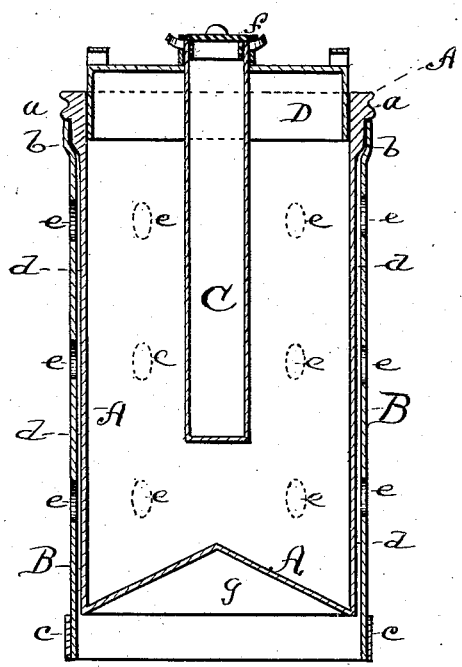
WITNESSES:
P. H. Parsons
J. R. Drake
Chas. S. Shepard,
INVENTOR
BY J. R. Drake
ATTORNEY

UNITED STATES PATENT OFFICE.

CHARLES S. SHEPARD, OF CHERRY CREEK, NEW YORK.

MILK-CAN.

SPECIFICATION forming part of Letters Patent No. 258,948, dated June 6, 1882.

Application filed September 21, 1881. (No model.)

*To all whom it may concern:*

Be it known that I, CHARLES S. SHEPARD, a citizen of the United States, residing at Cherry Creek, in the county of Chautauqua and State of New York, have made certain Improvements in Milk-Cans, of which the following is a specification.

This invention relates to the large milk-cans used for transporting milk, the main object being to prevent damage to the cans by constant and rough handling, also to keep the milk in these cans cool in hot weather; and the invention consists in the construction as fully hereinafter specified.

In the drawing the figure represents a cross-section through the center of the entire device.

A indicates the can or milk-receptacle, surrounded by a case or jacket, B, and held therein by a projecting rim or shoulder, $a$, on the upper edge of the can A, and which sets on or into a circular enlarged rim or bearing, $b$, on or in the edge of the top of the outer case, B. To protect the bottom of the can A and keep it from contact with the ground, &c., the outer case, B, is made longer at the bottom, and projects below the inner can, A, as shown, and is further strengthened by a metal rim, $c$, at the bottom, to prevent denting, bending, &c. This leaves an open space, $g$, between the ground and the bottom of the inner can, A. As is well known, it is very important to keep the bottom of a milk can or receptacle free from dents in which even a single drop of sour milk can lodge, as it will soon turn the fresh milk put in thereafter. The can A, with its shoulder $a$ resting upon the top of the outer case, B, and being shorter than said outer case, entirely prevents concussions against the bottom. The outer case, B, being strengthened around the base by the rim $c$, prevents indentation. The jacket B has a further important object, viz: As the can A is held therein, a space, $d$, is left all around between the two and a series of holes, $e\ e\ e$, made in the outer case, B, to admit air between the two, (partly shown in dotted lines or circles through the inner can, A.) In addition, a central refrigerating-tube, C, is suspended in the can A through the cover D. This is filled with ice or cold water to keep the milk cold and sweet. It sets down some distance in the can, and is removable when the weather is too cool to require any artificial cooling of the milk. The tube C has a cap or cover, $f$, and when the tube is removed it covers the opening left. The outer case keeps off the hot air of the atmosphere, and the open circular space $d$ is kept cool by retaining the cool air and by the coolness of the can A. The main cover D slides down in the can A, and is pushed down as fast as the milk therein is withdrawn. This prevents the milk slopping and working while carried about, but is not a novel feature of itself.

I claim—

The milk can and cooler described, consisting of an inner can, A, provided with the shoulder $a$, cover D, and cooling-tube C, and the outer case, B, provided with the holes $e$, and extending below the base of the can A, the whole being constructed of metal and having an air-chamber, $d$, between the can A and case B, substantially as set forth.

In witness whereof I have hereunto signed my name in the presence of two subscribing witnesses.

C. S. SHEPARD.

Witnesses:
 J. R. DRAKE,
 H. N. SHEPARD.